US008204075B2

(12) United States Patent
Rofougaran et al.

(10) Patent No.: US 8,204,075 B2
(45) Date of Patent: Jun. 19, 2012

(54) INTER-DEVICE WIRELESS COMMUNICATION FOR INTRA-DEVICE COMMUNICATIONS

(75) Inventors: Ahmadreza (Reza) Rofougaran, Newport Coast, CA (US); Timothy W. Markison, Lahaina, HI (US)

(73) Assignee: Broadcom Corporation, Irvine, CA (US)

( * ) Notice: Subject to any disclaimer, the term of this patent is extended or adjusted under 35 U.S.C. 154(b) by 460 days.

(21) Appl. No.: 12/433,849

(22) Filed: Apr. 30, 2009

(65) Prior Publication Data

US 2009/0215396 A1    Aug. 27, 2009

Related U.S. Application Data

(63) Continuation-in-part of application No. 11/700,285, filed on Jan. 31, 2007.

(51) Int. Cl.
*H04L 12/66* (2006.01)
(52) U.S. Cl. ........ 370/463; 370/451; 370/328; 370/338; 455/41.2; 455/3.03; 340/572.4
(58) Field of Classification Search .................. 370/463, 370/451, 346, 328, 338, 310.2; 455/41.2, 455/3.03, 418; 340/572.4; 711/154
See application file for complete search history.

(56) References Cited

U.S. PATENT DOCUMENTS

| | | | |
|---|---|---|---|
| 4,807,183 A | 2/1989 | Kung | |
| 5,502,683 A | 3/1996 | Marchioro | |
| 5,754,948 A | 5/1998 | Metze | |
| 5,786,912 A | 7/1998 | Kartalopoulos | |
| 5,809,321 A | 9/1998 | Hansen | |
| 5,884,104 A | 3/1999 | Chase | |
| 6,182,203 B1 | 1/2001 | Simar | |
| 6,438,622 B1 | 8/2002 | Haghighi et al. | |
| 6,500,070 B1 | 12/2002 | Tomizawa et al. | |
| 6,663,295 B2 | 12/2003 | Kami et al. | |
| 6,735,663 B2 | 5/2004 | Watts, Jr. et al. | |
| 6,735,708 B2 | 5/2004 | Watts, Jr. | |

(Continued)

FOREIGN PATENT DOCUMENTS

EP    1499070 A2    1/2005

(Continued)

OTHER PUBLICATIONS

Bruce K Gale, "RF, Electrical, and Magnetic Microsystems," date unknown, 8 pages.

(Continued)

*Primary Examiner* — Shaima Q Aminzay
(74) *Attorney, Agent, or Firm* — Garlick & Markison; Bruce E. Garlick

(57) ABSTRACT

To support an intra-device communication using inter-device wireless communications, an RF bus controller is operably coupled to receive an RF bus access request from one of a plurality of circuit modules for an intra-device RF communication. The RF bus controller determines whether to grant the RF bus access request using intra-device RF bus resources or inter-device RF bus resources. The RF bus controller determines desired inter-device RF bus resources of another device when the inter-device RF bus resources are to be used. The RF bus controller transmit a request for access to the desired inter-device RF bus resources to an RF bus controller of the another device. The RF bus controller establishes an RF communication link between the one of the plurality of circuit modules and a target circuit module of another IC within the device when access to the desired inter-device RF bus resources is granted.

22 Claims, 8 Drawing Sheets

U.S. PATENT DOCUMENTS

| | | | |
|---|---|---|---|
| 6,801,974 B1 | 10/2004 | Watts, Jr. et al. | |
| 6,816,925 B2 | 11/2004 | Watts, Jr. | |
| 7,065,326 B2 | 6/2006 | Lovberg | |
| 7,082,285 B2 | 7/2006 | Linde | |
| 7,149,837 B2 | 12/2006 | Watts, Jr. et al. | |
| 7,159,099 B2 | 1/2007 | Lucas | |
| 7,171,050 B2 | 1/2007 | Kim | |
| 7,197,584 B2 | 3/2007 | Huber et al. | |
| 7,218,143 B1 | 5/2007 | Young | |
| 7,257,093 B1 | 8/2007 | Witzke | |
| 7,330,702 B2 | 2/2008 | Chen et al. | |
| 7,406,062 B2 | 7/2008 | Hsu | |
| 7,444,393 B2 | 10/2008 | Chung | |
| 7,903,724 B2 * | 3/2011 | Rofougaran | 375/219 |
| 7,929,474 B2 | 4/2011 | Pettus | |
| 2002/0022521 A1 | 2/2002 | Idaka | |
| 2002/0049806 A1 | 4/2002 | Gatz et al. | |
| 2002/0061012 A1 | 5/2002 | Thi | |
| 2002/0107010 A1 * | 8/2002 | Witte et al. | 455/418 |
| 2002/0164945 A1 | 11/2002 | Olsen | |
| 2003/0001882 A1 | 1/2003 | Macer et al. | |
| 2003/0017845 A1 | 1/2003 | Doviak | |
| 2003/0040284 A1 | 2/2003 | Sato | |
| 2003/0059022 A1 | 3/2003 | Nebiker | |
| 2003/0078071 A1 | 4/2003 | Uchimyama | |
| 2003/0112585 A1 | 6/2003 | Silvester | |
| 2003/0126335 A1 | 7/2003 | Silvester | |
| 2003/0128712 A1 | 7/2003 | Moriwaki | |
| 2003/0162503 A1 | 8/2003 | LeCren | |
| 2003/0172380 A1 | 9/2003 | Kikinis | |
| 2003/0221036 A1 | 11/2003 | Konetski | |
| 2004/0054776 A1 | 3/2004 | Klotz | |
| 2004/0062308 A1 | 4/2004 | Kamosa | |
| 2004/0117442 A1 | 6/2004 | Thielen | |
| 2004/0123113 A1 | 6/2004 | Mathiassen et al. | |
| 2004/0153863 A1 | 8/2004 | Klotz | |
| 2004/0157559 A1 | 8/2004 | Sugikawa | |
| 2004/0174431 A1 | 9/2004 | Stienstra | |
| 2004/0203364 A1 | 10/2004 | Silvester | |
| 2004/0266336 A1 | 12/2004 | Patsiokas et al. | |
| 2005/0014468 A1 | 1/2005 | Salokannel | |
| 2005/0060598 A1 | 3/2005 | Klotz | |
| 2005/0124307 A1 | 6/2005 | Ammar et al. | |
| 2005/0185364 A1 | 8/2005 | Bell | |
| 2005/0250531 A1 | 11/2005 | Takebe et al. | |
| 2006/0026348 A1 | 2/2006 | Wallace | |
| 2006/0038731 A1 * | 2/2006 | Turner et al. | 343/742 |
| 2006/0046762 A1 | 3/2006 | Yoon et al. | |
| 2006/0085675 A1 | 4/2006 | Popell | |
| 2006/0101164 A1 | 5/2006 | Lee | |
| 2006/0148568 A1 | 7/2006 | Schultz et al. | |
| 2006/0164271 A1 | 7/2006 | Hirt | |
| 2006/0167784 A1 | 7/2006 | Hoffberg | |
| 2006/0176851 A1 | 8/2006 | Bennett | |
| 2006/0190691 A1 * | 8/2006 | Chauve et al. | 711/154 |
| 2006/0203758 A1 | 9/2006 | Tee et al. | |
| 2006/0252470 A1 | 11/2006 | Seshadri | |
| 2006/0260546 A1 * | 11/2006 | Usami | 118/722 |
| 2006/0262026 A1 | 11/2006 | Gainey et al. | |
| 2006/0269004 A1 | 11/2006 | Ibrahim | |
| 2006/0282635 A1 | 12/2006 | Mather | |
| 2007/0015558 A1 | 1/2007 | Zalewski et al. | |
| 2007/0038808 A1 | 2/2007 | Yim | |
| 2007/0147152 A1 | 6/2007 | Sekiguchi | |
| 2007/0155502 A1 | 7/2007 | Wu | |
| 2007/0167149 A1 | 7/2007 | Comstock | |
| 2007/0229270 A1 | 10/2007 | Rofougaran | |
| 2007/0239929 A1 | 10/2007 | Chen | |
| 2007/0268481 A1 | 11/2007 | Raskar et al. | |
| 2007/0298882 A1 | 12/2007 | Marks et al. | |
| 2008/0020843 A1 | 1/2008 | Wolinsky | |
| 2008/0028118 A1 | 1/2008 | Sayers et al. | |
| 2008/0040541 A1 | 2/2008 | Brockmann | |
| 2008/0063236 A1 | 3/2008 | Ikenoue et al. | |
| 2008/0070516 A1 | 3/2008 | Lee | |
| 2008/0076406 A1 | 3/2008 | Chen | |
| 2008/0151847 A1 | 6/2008 | Abujbara | |
| 2008/0181186 A1 * | 7/2008 | Rofougaran | 370/338 |
| 2008/0181252 A1 * | 7/2008 | Rofougaran | 370/451 |
| 2009/0006640 A1 | 1/2009 | Brouwer | |
| 2009/0198854 A1 | 8/2009 | Rofougaran | |
| 2009/0215533 A1 | 8/2009 | Zalewski et al. | |
| 2010/0146199 A1 | 6/2010 | Shaeffer | |

FOREIGN PATENT DOCUMENTS

| | | |
|---|---|---|
| WO | 2009002464 A2 | 12/2008 |

OTHER PUBLICATIONS

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1986.

Xilinx Inc.: Spartan-3AN FPGA Family Data Sheet, DS557, Jun. 2, 2008, pp. 5.

Haworth, et al.; Public Security Screening for Metallic Objects with Millimetre-Wave Images; Heriot-Watt University; United Kingdom; pp. 1-4.

Elsadek, et al.; "A Compact 3-D Microwave Holographic Pointer System Using a Size Reduced Microstrip Planar Array"; Department of Electrical and Computer Engineering; University of California; pp. 1-5.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4.

E3 Wii Controller; Nintendo Wilmote; Technology Limitations; XGAMING, Inc.; pp. 1-5.

* cited by examiner

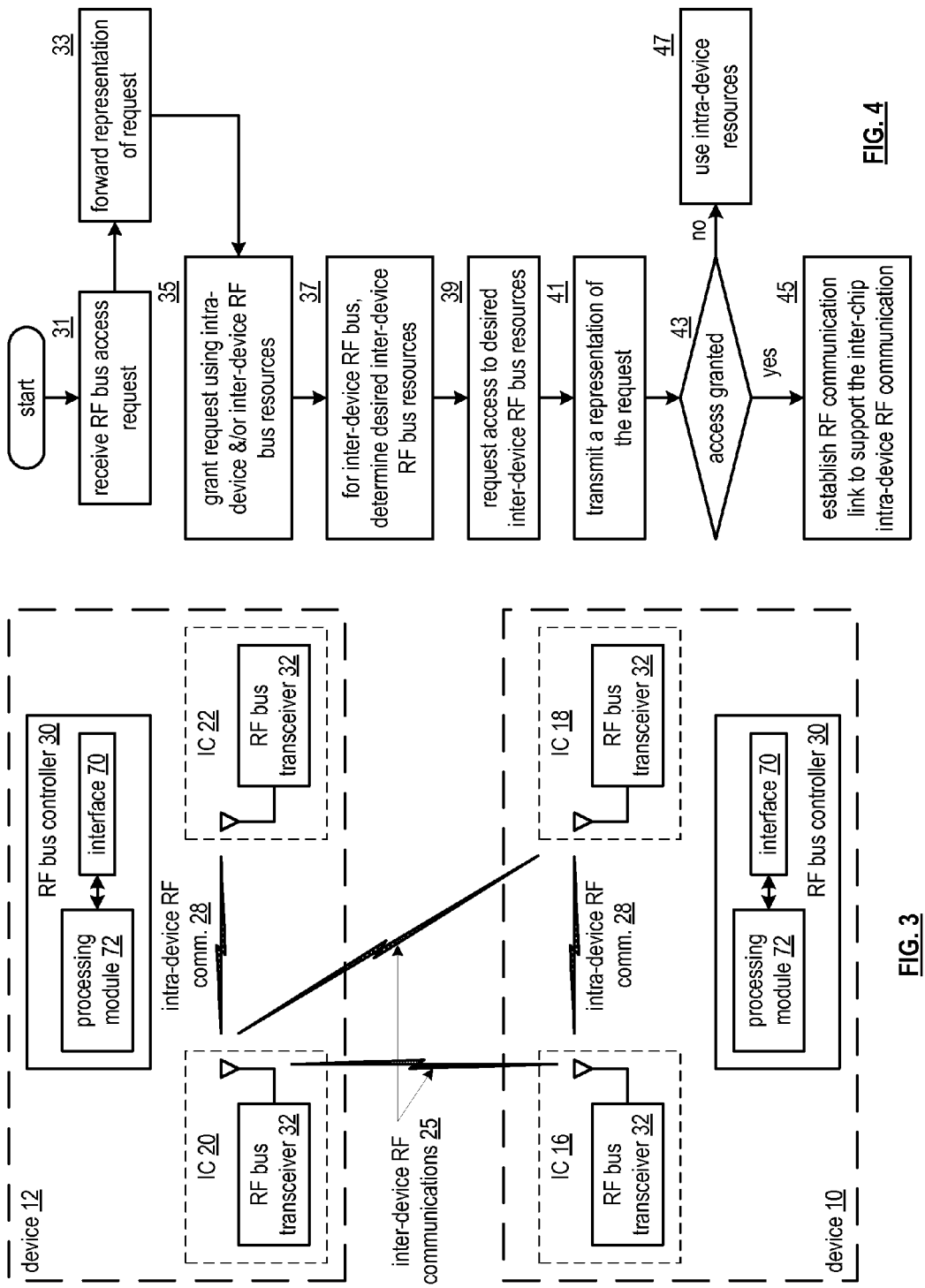

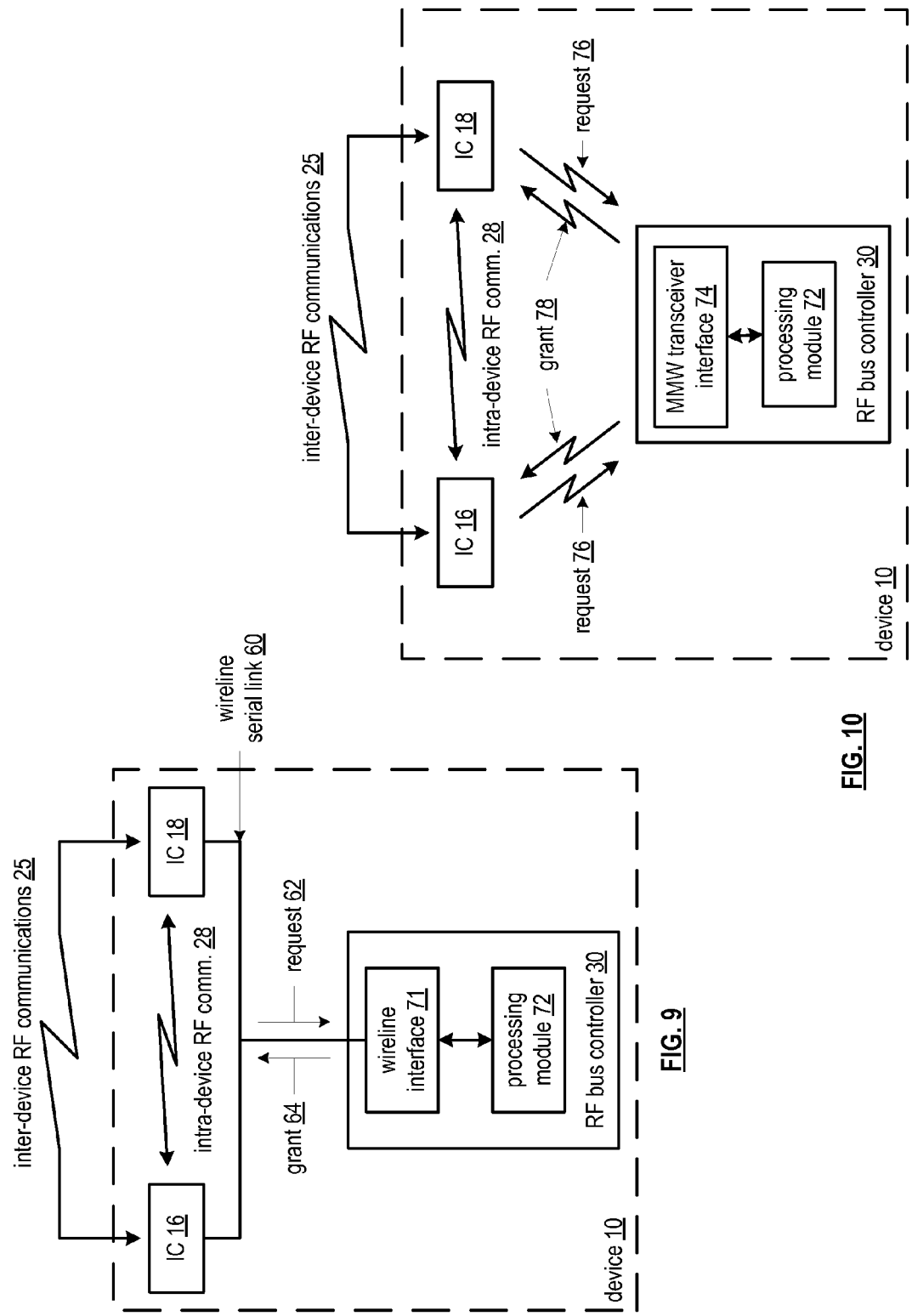

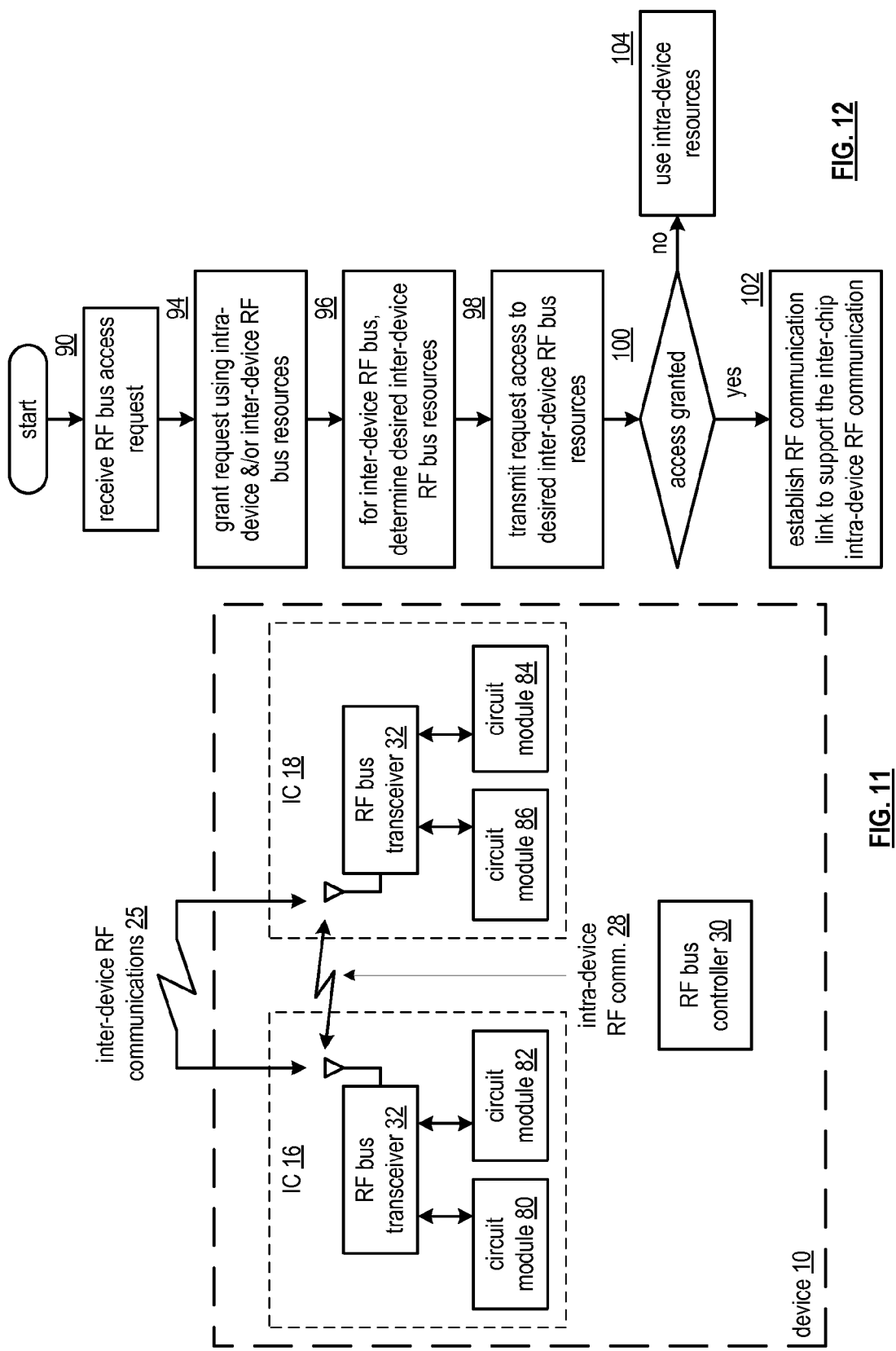

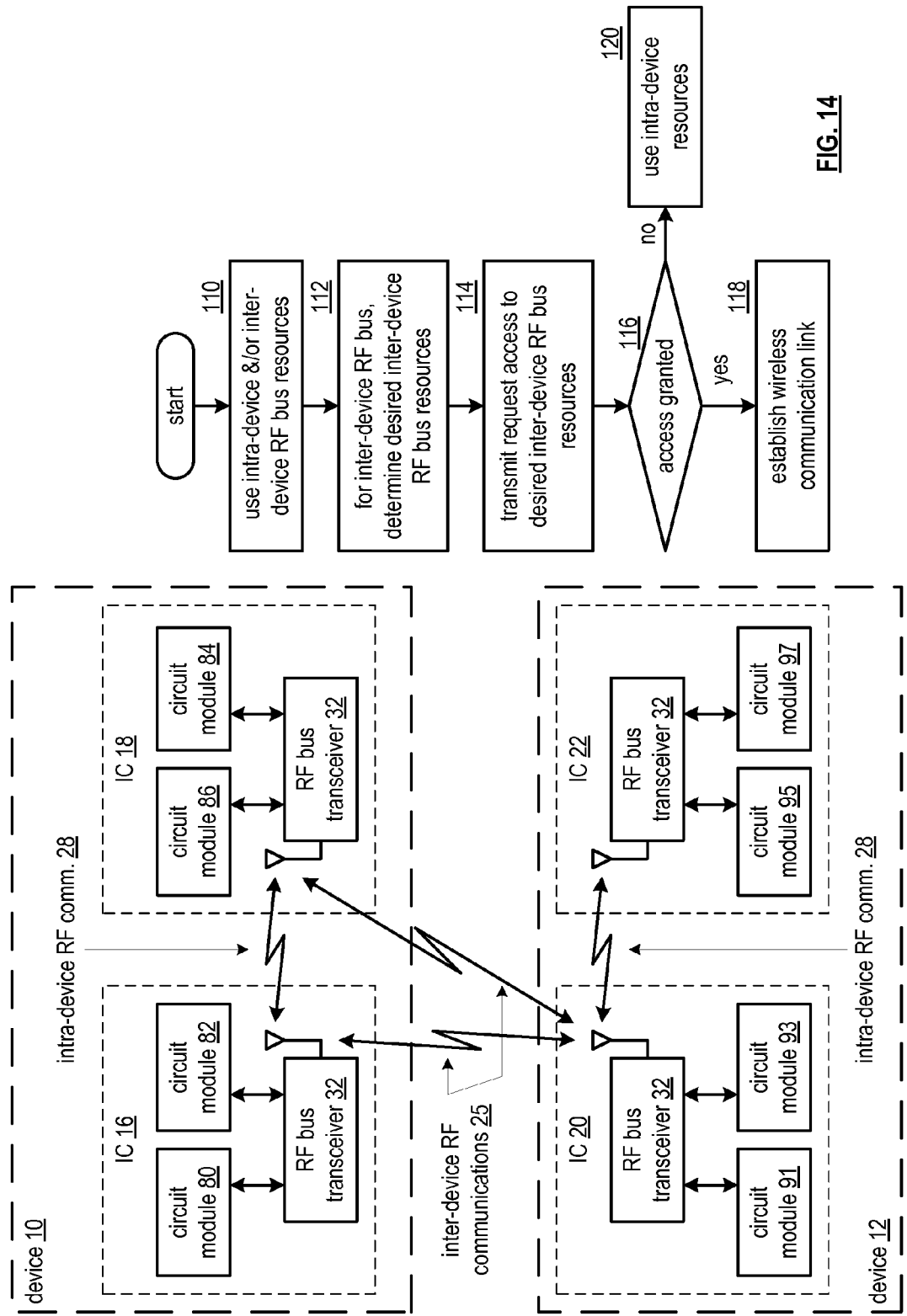

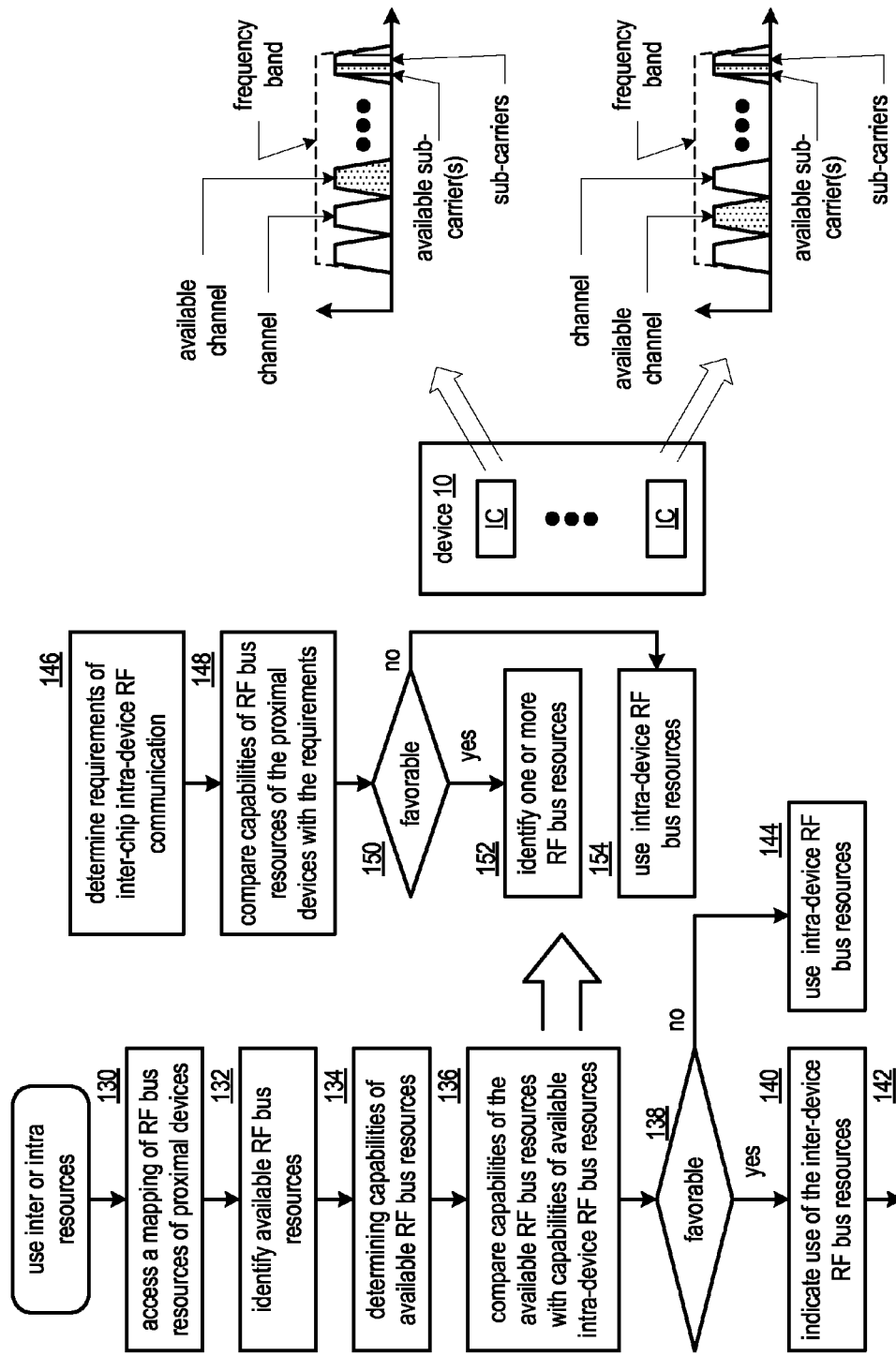

INTER-DEVICE WIRELESS COMMUNICATION FOR INTRA-DEVICE COMMUNICATIONS

This patent application is claiming priority under 35 USC §120 as a continuation-in-part patent application of co-pending patent application entitled RF BUS CONTROLLER, having a filing date of Jan. 31, 2007, and a Ser. No. 11/700,285.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communications and more particularly to using a radio frequency bus structure for inter-device wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In most applications, radio transceivers are implemented in one or more integrated circuits (ICs), which are inter-coupled via traces on a printed circuit board (PCB). The radio transceivers operate within licensed or unlicensed frequency spectrums. For example, wireless local area network (WLAN) transceivers communicate data within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain.

As IC fabrication technology continues to advance, ICs will become smaller and smaller with more and more transistors. While this advancement allows for reduction in size of electronic devices, it does present a design challenge of providing and receiving signals, data, clock signals, operational instructions, etc., to and from a plurality of ICs of the device. Currently, this is addressed by improvements in IC packaging and multiple layer PCBs. For example, ICs may include a ball-grid array of 100-200 pins in a small space (e.g., 2 to 20 millimeters by 2 to 20 millimeters). A multiple layer PCB includes traces for each one of the pins of the IC to route to at least one other component on the PCB. Clearly, advancements in communication between ICs are needed to adequately support the forth-coming improvements in IC fabrication.

Therefore, a need exists for intra-device and/or inter-device wireless communications and applications thereof.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 3 is a schematic block diagram of another embodiment of inter-device wireless communications in accordance with the present invention;

FIG. 4 is a logic diagram of an embodiment of a method for inter-device wireless communications in accordance with the present invention;

Figure 8:
Figure 18:
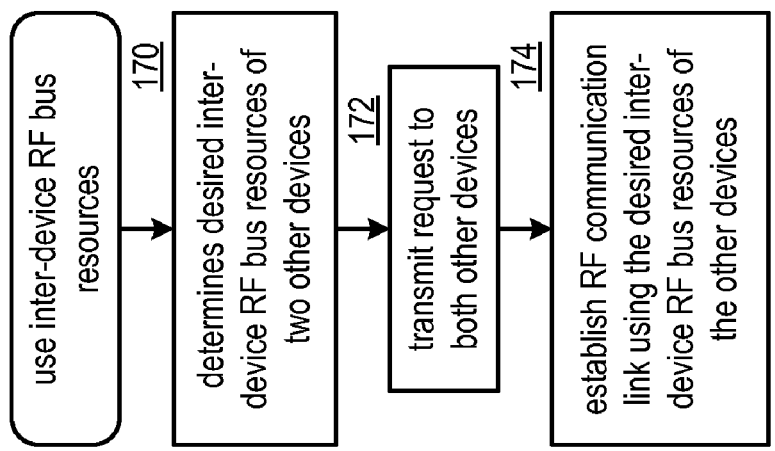
Figure 17:
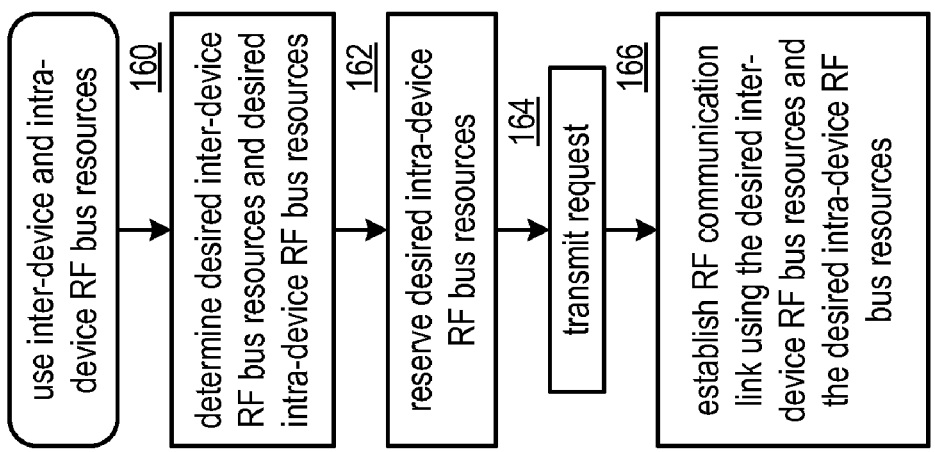

FIG. 8 diagram of an embodiment of inter-device wireless communications in accordance with the present invention;

FIG. 9 is a schematic block diagram of an embodiment of a device in accordance with the present invention;

FIG. 10 is a schematic block diagram of another embodiment of a device in accordance with the present invention;

FIG. 11 is a schematic block diagram of another embodiment of a device in accordance with the present invention;

FIG. 12 is a logic diagram of an embodiment of a method for inter-device wireless communications in accordance with the present invention;

FIG. 13 is a schematic block diagram of another embodiment of inter-device wireless communications in accordance with the present invention;

FIG. 14 is a logic diagram of another embodiment of a method for inter-device wireless communications in accordance with the present invention;

FIG. 15 is a logic diagram of another embodiment of a method for inter-device wireless communications in accordance with the present invention;

FIG. 16 is a diagram of an example of a mapping of RF bus resources in accordance with the present invention;

FIG. 17 is a logic diagram of another embodiment of a method for inter-device wireless communications in accordance with the present invention; and FIG. 18 is a logic diagram of another embodiment of a method for inter-device wireless communications in accordance with the present invention.

DETAILED DESCRIPTION OF THE INVENTION

Figure 1:
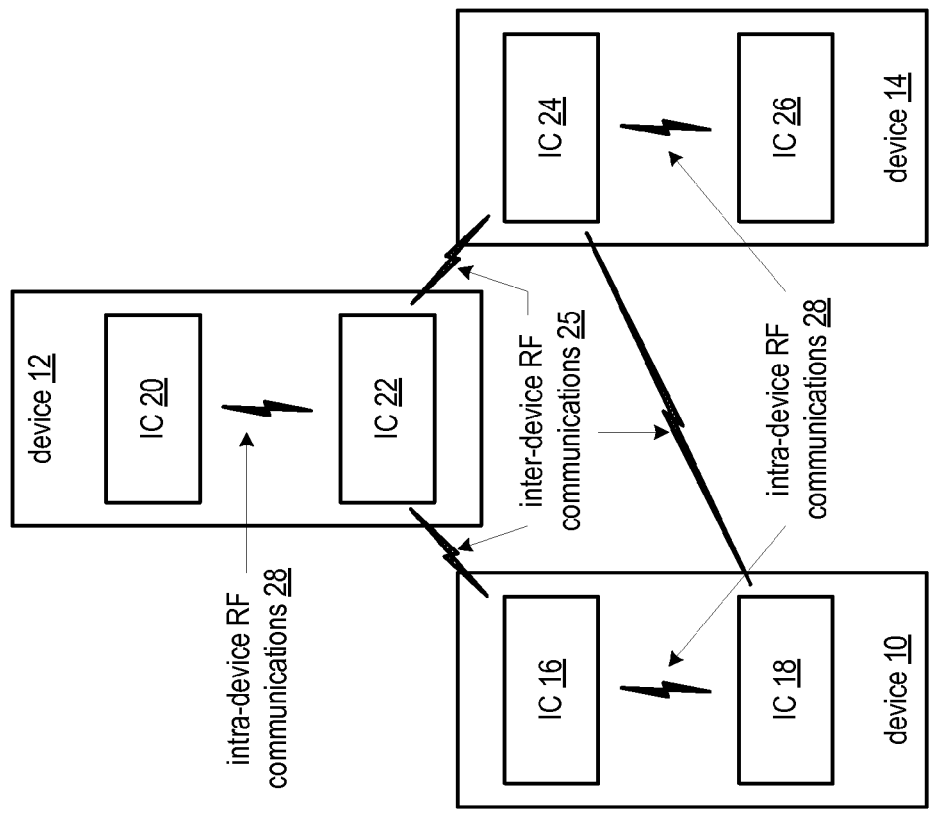
FIG. 1 is a schematic block diagram of an embodiment of inter-device wireless communications in accordance with the present invention.

FIG. 1 is a schematic block diagram of an embodiment of intra-device wireless communications and inter-device wireless communications between a plurality of devices 10-14 that are in close proximity (e.g., within a few meters of each other). The devices may be portable devices or fixed devices. For example, the portable devices may be cell phones, personal digital assistants, digital music players, digital video players, laptop computers, handheld computers, video game controllers, and/or any other portable equipment that includes integrated circuits. The fixed devices may be personal computers, cable set-top boxes, satellite receivers, television sets, printers, fax machines, home entertainment equipment, video game console, and/or any type of home or office equipment that includes integrated circuits. Each of the devices 10-14 includes a plurality of integrated circuits (IC) 16-18, 20-22, and 24-26.

Within a device 10-14, the ICs 16-18, 20-22, 24-26 may communicate data therebetween using a radio frequency (RF) bus structure as described in the parent patent application. For example, IC 16 of device 10 may communicate data (e.g., digitized voice data, digitized audio data, digitized video data, text data, graphics data, operational instructions, computational data, intermediate computational data, etc.) with IC 18 via an intra-device RF communication 28. As will be described in greater detail with reference to FIGS. 5-7, the intra-device RF communications may be through the air, via waveguide, and/or via a substrate of differing dielectric layers.

In accordance with one or more embodiments of the present invention, the ICs 16-18, 20-22, 24-26 within a device 10-14 may communication therebetween using one or more inter-device RF communications 25. For example, IC 16 of device 10 may communicate with IC 18 using inter-device RF communications 25. In a specific example, data may be conveyed between IC 16 and IC 18 via IC 22 of device 12 and IC 24 of device 14. In this example, IC 16 generates an RF signal containing the data, or a portion thereof, and routing information as determined by the IC 16 and/or an RF bus controller (as will be described below). IC transmits the RF to IC 22 of device 12, which interprets the RF signal to determine the routing information and, based on the interpretation, forwards the RF signal to IC 24 of device 14. IC 24 of device 14 interprets the forwarded RF signal and subsequently forwards the RF signal to IC 18 of device 10.

If, in this example, IC 18 has data it desires to convey to IC 16, it may use the traverse of the path it received data from IC 16 or another path. For instance, IC 18 may convey data via an intra-device RF communication 28 or a different inter-device RF communication. With respect to this latter point, IC 18 may communicate data to IC 16 via IC 26 of device 14 and IC 20 of device 12. In this manner, a full duplex RF communication path is established between ICs 16 and 18.

As another example, data may be conveyed between IC 16 and IC 18 via IC 22 of device 12, another IC of device 12, or one of the ICs of device 14. In a specific example, IC 16 generates an RF signal containing the data, or a portion thereof, and routing information as determined by the IC 16 and/or an RF bus controller. IC 16 transmits the RF to IC 22 of device 12, which interprets the RF signal to determine the routing information and, based on the interpretation, forwards the RF signal to IC 18 of device 10.

Continuing with this example, if IC 18 has data it desires to convey to IC 16, it may use the traverse of the path it received data from IC 16 or another path. For instance, IC 18 may convey data via an intra-device RF communication 28 or a different inter-device RF communication. With respect to this latter point, IC 18 may communicate data to IC 16 via IC 26 of device 14 or IC 20 of device 12.

An IC or RF bus controller determines whether to use intra-device RF communications 28 and/or inter-device RF communications 25 based on one or more conditions. Such conditions include processing requirements to generate the RF signal (e.g., baseband processing, availability of intra-device RF communication resources, availability of inter-device RF communication resources, power source of the devices, if powered via battery, available power levels, power consumption, amount of data for conveyance, requested data rate, duration of conveyance, bandwidth requirements, and/or beamforming processing at RF and/or at baseband). The baseband processing includes, for converting an inbound symbol stream into inbound data, digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling; and includes, for converting outbound data into an outbound symbol stream, scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

Figure 2:
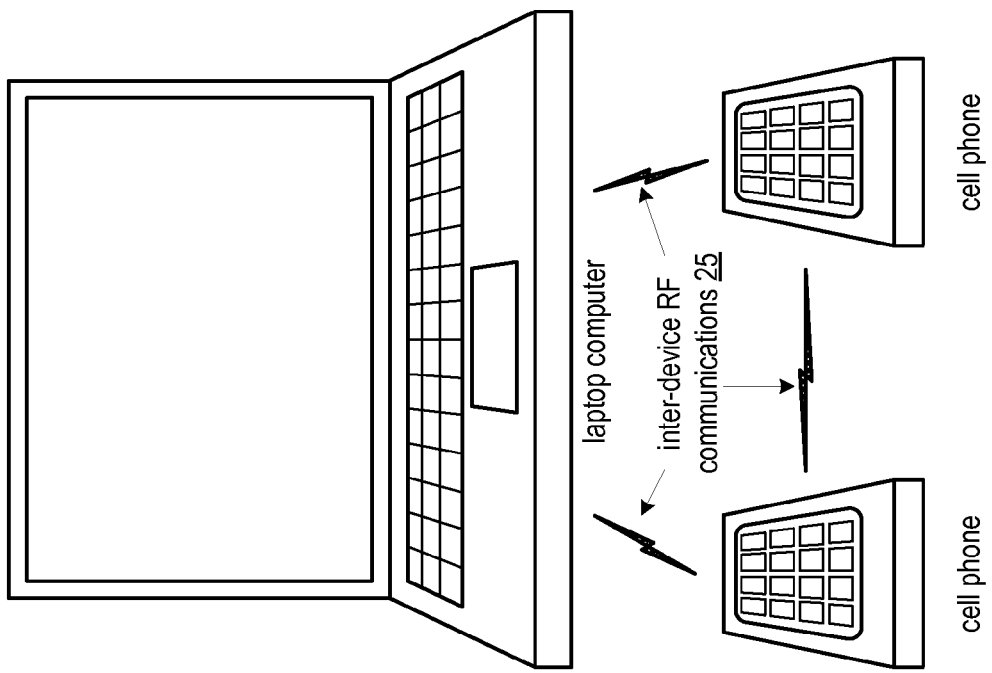
FIG. 2 is a schematic block diagram of another embodiment of inter-device wireless communications in accordance with the present invention.

FIG. 2 is a schematic block diagram of another embodiment of inter-device wireless communications 25 between a plurality of devices. In this example, the plurality of devices includes two cell phones and a laptop computer. Each of these devices includes a plurality of ICs, wherein at least some of the ICs have an RF bus transceiver to support inter-device and/or intra-device RF communications. As a specific example, assume that a user is using the laptop computer, the cell phones are not currently in use, one of the cell phones is connected to a charger, and the other cell phone is battery powered. Under these conditions, ICs within the laptop computer may use the RF bus transceivers of the ICs of the cell phones (with deference to the cell phone on the charger) to support communications between the ICs of the laptop using inter-device RF communications 25 as generally described with reference to FIG. 1.

FIG. 3 is a schematic block diagram of another embodiment of inter-device wireless communications 25 between device 10 and device 12. Each of the devices 10 and 12 includes a plurality of ICs 16-18 and 20-22 and an RF bus controller 30. At least some of the ICs 16-18 and 20-22 include an RF bus transceiver 32 and the RF bus controller 30 includes an interface module 70 and a processing module 72. The processing module 72 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 72 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 72 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-18.

In an example of operation as described with reference to FIGS. 3 and 4, an IC determines that it has data to convey to another IC. For instance, IC 16 may determine that it has data or an operational instruction(s) to transmit to IC 18. As a specific example IC 16 may be a memory controller and IC 18 includes a peripheral component interface (PCI) module coupled to one or more peripheral components. Upon determining that is has data or an operational instruction(s) to transmit, the IC 16 transmits an RF bus access request to the interface module 70 of the RF bus controller 30 (step 31 of FIG. 4). The RF bus access request includes one or more of the identity of the requesting IC or circuit module therein, the identity of one or more the targeted ICs or circuit modules therein, the amount of data, etc.

At step 33 of FIG. 4, the interface module 70 forwards a representation of the RF bus access request to the processing module 70. The representation of the RF bus access request may be the RF bus access request itself or a modification thereof. For instance, the representation may include an interpretation of the RF bus access request (e.g., determine the requester, the priority of the request, etc. to prioritize in a request queue). As another alternative or in furtherance of the previous examples, the representation may include a re-packetization of the RF bus access request (e.g., add header information, remove header information, change from one packet format to another, etc.). As yet another alternative or in furtherance of the previous examples, the representation may be a signal transformation of the RF bus access request (e.g., level shift, buffering, driving, etc.) As a further alternative or in furtherance of the previous examples, the representation may be a portion of the RF bus access request (e.g., identity of the source and destination).

At step 35 of FIG. 4, the processing module 70 determines whether to grant the RF bus access request using intra-device RF bus resources or inter-device RF bus resources. The RF bus resources includes a listing of the ICs that include one or more RF bus transceivers, the capabilities of the RF bus transceivers (e.g., transmit power, baseband processing, beamforming processing, operating frequency band—2.4 GHz, 5 GHz, 29 GHz, 60 GHz, etc.—, wireless communication protocols, receiver sensitivity, etc.), available frequency bands, channel, time slots, frequency slots, code slots, and/or sub-carriers of the wireless protocols supported by each the RF bus transceivers, etc. An example of determining is provided with reference to FIG. 15.

At step 37 of FIG. 4, when the inter-device RF bus resources are to be used, the processing module 72 determines desired inter-device RF bus resources of another device. For example, the RF bus controller 30 determines that RF bus transceiver 32 of IC 20 of device 12 is desired to support the inter-device RF communication 25 between IC 16 and IC 18 of device 10. Such a determination is based on a matching of the requirements for the communication with the capabilities of the available RF bus resources. For example, can the available RF bus resources support the data rate, the desired error rate, etc. of the communication.

At step 39 of FIG. 4, the processing module 70 generates a request for access to the desired inter-device RF bus resources. In an embodiment, the request identifies the requested resources, the identification of the RF bus controller making the request, the identity of the source of the communication, and the identity of the one or more destinations of the communication. The method continues at step 41, where the interface module transmits a representation of the request for access to the desired inter-device RF bus resources to an RF bus controller of the other device (e.g., controller 30 of device 12).

The RF bus controller 30 of device 12 processes the request for access to the desired inter-device RF bus resources in a similar manner as it would process a request from an IC 20-22 within device 12. The RF bus controller 30 processes a request for intra-devices communications 28 based on the availability of the resources, whether the resources are designated for such use, and whether the resources have the capabilities to support the communication. For inter-device communication requests, the RF bus controller also determines whether the device is in a mode to support inter-device RF communications 25 (e.g., has sufficient power to support the inter-device communication). If so, the RF bus controller 30 of device 12 grants the request.

The method of FIG. 4 branches at step 43 depending on whether the access request is granted. If not, the method continues at step 47 where the RF bus controller allocates intra-device RF bus resources to support the communication between the ICs and/or circuit modules therein. If, however, access is granted, the method continues at step 45 where the processing module 72 establishes an RF communication link to support the inter-chip intra-device RF communication (e.g., allocates the resources and informs the participants in the communication that the link is established via the allocated resources).

Figure 5:
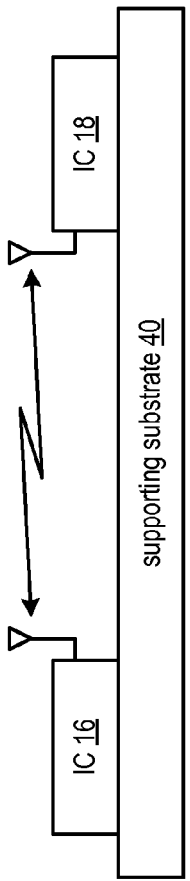
FIGS. 5-7 are diagrams of embodiments of intra-device wireless communications in accordance with the present invention.
Figure 6:
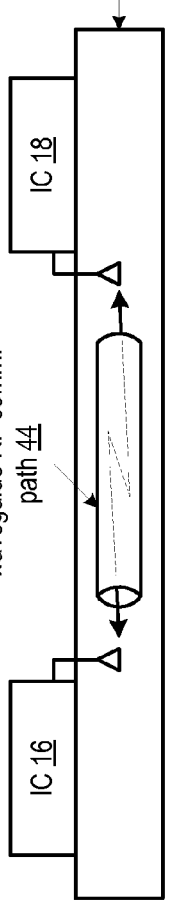
Figure 7:
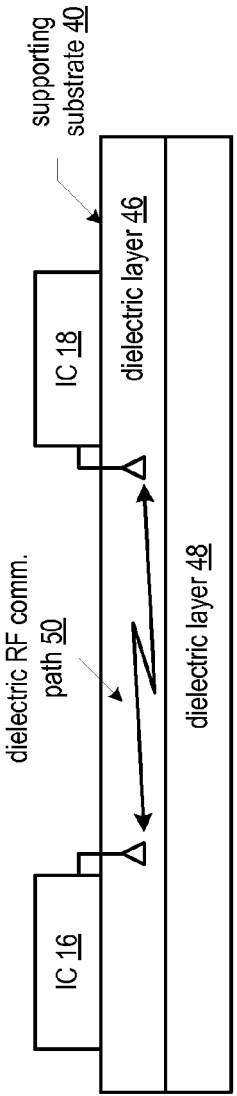

FIGS. 5-7 are diagrams of embodiments of intra-device wireless communications 28 being conveyed over different types of RF communication paths. In these embodiments, the antenna of each IC 16-18 is shown external to the IC for ease of illustration, but, in most ICs embodiments, the antenna will be in the IC.

FIG. 5 illustrates the device 10 further including a supporting substrate 40 that supports the ICs 16-18. In this embodiment, the intra-device RF communications 28 occur over a free-space RF communication path 42. In other words, the intra-device RF communications 28 are conveyed via the air.

FIG. 6 illustrates the device 10 having the supporting substrate 40 including a waveguide RF communication path 44. In this embodiment, the intra-device RF communications 28 occur via the waveguide RF communication path 44. The waveguide RF communication path 44 may be formed in a micro-electromechanical (MEM) area of the supporting substrate 40. The use of a MEM area to provide an RF bus structure to support intra-device RF communications 28 (which includes inter-IC RF communications and/or intra-IC RF communications) is described in greater detail with reference to FIGS. 36-46 of the parent patent application.

FIG. 7 illustrates the device 10 having the supporting substrate 40 including a plurality of dielectric layers 46-48. In this embodiment, the dielectric layers 46-48 have different dielectric properties such that the border between dielectric layer 46 and dielectric layer 48 reflect the RF signals transceived by the ICs 16 and 18. In this manner, dielectric layer 46 provides a dielectric RF communication path 50 for the intra-device RF communications 28.

In an embodiment of device 10, the intra-device RF communications 28 may occur over the free-space RF communication path 42, the waveguide RF communication path 44, and/or the dielectric RF communication path 50. In this embodiment, the RF bus controller 30 further functions to select one of the waveguide RF communication path 44, the dielectric layer RF communication path 50, or the free space RF communication path 42 based on at least one aspect of one of the intra-device RF communications. For example, high data rate and/or non-error tolerant communications (e.g., operating system level communications) may occur over the waveguide RF communication path 44, while lower data rate and/or error tolerant communications (e.g., some portions of application level communications) may occur over the free-space RF communication path 42. As another example, the aspect on which the RF communication path is selected may be user defined, operating system level defined, and/or pre-programmed into the device. As yet another example, the aspect may correspond to the IC initiating an intra-device RF communication and/or the IC receiving it. As a further example, the aspect may correspond to the number of intra-device RF communications 28 an IC currently has in progress.

FIG. 8 diagram of an embodiment of inter-device wireless communications between IC 16 of device 10 and IC 20 of device 12. Each of the devices 10 and 12 further includes a supporting substrate 40 that supports the respective ICs 16-18 and ICs 20-22. In this embodiment, the inter-device RF communications 25 occur over a free-space RF communication path 52. In other words, the intra-device RF communications 25 are conveyed via the air.

FIG. 9 is a schematic block diagram of another embodiment of the device 10 that includes the ICs 16-18 and the RF bus controller 30. In this embodiment, the RF bus controller 30 receives, via a wireless interface 71, RF bus requests 62 from the ICs 16-18 via a wireline serial link 60 or a parallel link. The RF bus controller 30 processes the RF bus requests 62 to produce RF bus grants 64, which are provided to the ICs 16-18 via the wireline serial link 60, or parallel link. As such, for the ICs 16-18 to access an RF bus to support the intra-device RF communications 28 or inter-device RF communications 25, the ICs 16-18 communicate with the RF bus controller 30 via the wireline serial link 60, or parallel link. Note that requests and grants are processed similarly within the other devices 12 and 14.

FIG. 10 is a schematic block diagram of another embodiment of the device 10 (or devices 12-14) that includes the ICs 16-18 and the RF bus controller 30. In this embodiment, the RF bus controller 30 receives RF bus requests 62 from the ICs 16-18 via a wireless interface. The RF bus controller 30 processes the RF bus requests 62 to produce RF bus grants 64, which are provided to the ICs 16-18 via the wireless interface. The RF bus request 62 and the RF bus grant 64 may be transceived at one carrier frequency while the intra-device RF communications 28 and/or inter-device RF communications 25 may be transceived at a different carrier frequency or different carrier frequencies. Alternatively, the RF bus request 62 and the RF bus grant 64 may be transceived at the carrier frequency or frequencies as the intra-device RF communications 28. Note that the wireless interface may be supported by millimeter wave (MMW) transceivers 74 within the RF bus controller 30 and similar MMW transceivers within the ICs 16-18. Further note that the MMW frequency band includes frequencies between 3 GHz to 300 GHz.

FIG. 11 is a schematic block diagram of another embodiment of the device 10 that includes the ICs 16-18 and the RF bus controller 30. In this embodiment, IC 16 includes circuit modules 80-82 and an RF bus transceiver 32 and IC 18 includes circuit modules 84-86 and an RF bus transceiver 32. The circuit modules 80-86 may be a hardware component (e.g., any type of digital circuit, analog circuit, logic circuit, processing circuit, etc.) or a software component (e.g., a system application, a user application, driver, etc.) being executed by a hardware component. For example, one of the circuit modules 80-82 may be, but is not limited to, a microprocessor, a component of a microprocessor, cache memory, read only memory, random access memory, programmable logic, digital signal processor, logic gate, amplifier, multiplier, adder, multiplexor, an operating system kernel, a user application, a system application, a peripheral device driver, etc.

In this embodiment, the inter-device RF communication 28, RF bus requests 62, and the RF bus grants 64 occur within the same frequency spectrum. To minimize interference between the obtaining access to the RF bus and using the RF bus for the inter-device RF communications 28, the bus controller 30 controls access to the frequency spectrum by allocating at least one communication slot per frame to the wireless interface and allocating at least one other communication slot per frame for the intra-device RF communications. The communication slots may be time division multiple access (TDMA) slots within a TDMA frame, frequency division multiple access (FDMA) slots of an FDMA frame, and/or code division multiple access (CDMA) slots of a CDMA frame. Note that in this embodiment, a frame is equivalent to a packet.

The RF bus transceivers 32, which are described in the parent patent application, support the inter-device RF communications 25. For example, when IC 16 conveys data and/or instructions to IC 18, the RF bus transceiver 32 associated with IC 16 transmits an RF signal to an RF bus transceiver of an IC of another device. The RF bus transceiver of the IC of the other device relays the RF signal to the RF bus transceiver 32 of IC 18.

FIG. 12 is a logic diagram of an embodiment of a method for inter-device wireless communications that begins at step 90 where the RF bus controller 30 of a device 10 receives an RF bus access request from one of the plurality of circuit modules for an intra-device RF communication. The RF bus access request includes one or more of the identity of the requesting IC or circuit module therein, the identity of one or more the targeted ICs or circuit modules therein, the amount of data, etc.

The method continues at step 94 where the RF bus controller determines whether to grant the RF bus access request using intra-device RF bus resources or inter-device RF bus resources. An example of this will be described in greater detail with reference to FIG. 15. The method continues at step 96 where the RF bus controller determines desired inter-device RF bus resources of another device when the inter-device RF bus resources are to be used. Such a determination is based on a matching of the requirements for the communication with the capabilities of the available RF bus resources. For example, can the available RF bus resources support the data rate, the desired error rate, etc. of the communication.

The method continues at step 98 where the RF bus controller transmits a request for access to the desired inter-device RF bus resources to an RF bus controller of the other device (e.g., controller 30 of device 12). In an embodiment, the request identifies the requested resources, the identification of the RF bus controller making the request, the identity of the source of the communication, and the identity of the one or more destinations of the communication.

The RF bus controller 30 of device 12 processes the request for access to the desired inter-device RF bus resources in a similar manner as it would process a request from an IC 20-22 within device 12. The RF bus controller 30 processes a request for intra-devices communications 28 based on the availability of the resources, whether the resources are designated for such use, and whether the resources have the capabilities to support the communication. For inter-device communication requests, the RF bus controller also determines whether the device is in a mode to support inter-device RF communications 25 (e.g., has sufficient power to support the inter-device communication). If so, the RF bus controller 30 of device 12 grants the request.

The method branches at step 100 depending on whether the access request is granted. If not, the method continues at step 104 where the RF bus controller allocates intra-device RF bus resources to support the communication between the ICs and/or circuit modules therein. If, however, access is granted, the method continues at step 102 where the RF bus controller establishes an RF communication link to support the inter-chip intra-device RF communication (e.g., allocates the resources and informs the participants in the communication that the link is established via the allocated resources).

FIG. 13 is a schematic block diagram of another embodiment of device 10 that includes the ICs 16-18 and device 12 that includes ICs 20-22. In this embodiment, each of the ICs 16-22 includes circuit modules 80-82, 84-86, 91, 95, 95, 97 and an RF bus transceiver 32. The circuit modules 80-86 91, 95, 95, 97 may be a hardware component (e.g., any type of digital circuit, analog circuit, logic circuit, processing circuit, etc.) or a software component (e.g., a system application, a user application, driver, etc.) being executed by a hardware component. For example, one of the circuit modules 80-86 91, 95, 95, 97 may be, but is not limited to, a microprocessor, a component of a microprocessor, cache memory, read only memory, random access memory, programmable logic, digital signal processor, logic gate, amplifier, multiplier, adder, multiplexor, an operating system kernel, a user application, a system application, a peripheral device driver, etc.

In this embodiment, the inter-device RF communication 28, RF bus requests 62, and the RF bus grants 64 occur within the same frequency spectrum and are processed by the IC initiating the request. To minimize interference between the obtaining access to the RF bus and using the RF bus for the inter-device RF communications 28, the IC controls access to the frequency spectrum by allocating at least one communication slot per frame to the wireless interface and allocating at least one other communication slot per frame for the intra-device RF communications. The communication slots may be time division multiple access (TDMA) slots within a TDMA frame, frequency division multiple access (FDMA) slots of an FDMA frame, and/or code division multiple access (CDMA) slots of a CDMA frame. Note that in this embodiment, a frame is equivalent to a packet.

The RF bus transceivers 32, which are described in the parent patent application, support the inter-device RF communications 25. For example, when IC 16 conveys data and/or instructions to IC 18, the RF bus transceiver 32 associated with IC 16 transmits an RF signal to RF bus transceiver 32 of an IC 20 of device 12. The RF bus transceiver 32 of IC 20 of the device 12 relays the RF signal to the RF bus transceiver 32 of IC 18.

FIG. 14 is a logic diagram of another embodiment of a method for inter-device wireless communications that begins at step 110 where an IC determines whether to establish the wireless communication link using intra-device RF bus resources or inter-device RF bus resources. An example of this is discussed in greater detail with reference to FIG. 15. The method continues at step 112 where the IC determines desired inter-device RF bus resources of another device when the inter-device RF bus resources are to be used. Such a determination is based on a matching of the requirements for the communication with the capabilities of the available RF bus resources. For example, can the available RF bus resources support the data rate, the desired error rate, etc. of the communication.

The method continues at step 114 where the IC transmits a request for access to the desired inter-device RF bus resources to an IC of the other device (e.g., IC 20 of device 12). In an embodiment, the request identifies the requested resources, the identification of the RF bus controller making the request, the identity of the source of the communication, and the identity of the one or more destinations of the communication.

The IC 20 of device 12 processes the request for access to the desired inter-device RF bus resources in a similar manner as it would process a request within device 12. The IC 20 processes a request for intra-devices communications 28 based on the availability of the resources, whether the resources are designated for such use, and whether the resources have the capabilities to support the communication. For inter-device communication requests, the IC also determines whether the device is in a mode to support inter-device RF communications 25 (e.g., has sufficient power to support the inter-device communication). If so, the IC 20 of device 12 grants the request.

The method branches at step 116 depending on whether the access request is granted. If not, the method continues at step 120 where the IC allocates intra-device RF bus resources to support the communication between the ICs and/or circuit modules therein. If, however, access is granted, the method continues at step 118 where the IC establishes an RF communication link to support the inter-chip intra-device RF communication (e.g., allocates the resources and informs the participants in the communication that the link is established via the allocated resources). Note that, within a device, one IC may be a master for processing RF bus requests or the tasks of processing the RF bus requests may be distributed among two or more of the ICs.

FIG. 15 is a logic diagram of another embodiment of a method for inter-device wireless communications. In particular, this method describes an example of determining whether to use inter-device communication resources or intra-device communication resources. The method begins at step 130 where a mapping of RF bus resources of proximal devices is accessed. An example of the mapping is provided with reference to FIG. 16.

As shown in FIG. 16, each IC has an associated frequency band or frequency bands that it supports. Each frequency band is divided into a plurality of channels, which may, in turn, be divided into a plurality of sub-carriers, time slots, frequency slots, and/or code slots. Each of these partitions of a frequency band corresponds to an RF bus resource. The controller of a device may determine which, if any, of the RF bus resources are available for inter-device RF communications. In addition to the frequency band partitioning, the mapping may further include the various wireless communication protocols that can be supported by RF bus transceivers and in which frequency bands. The mapping may further include bandwidth of each of the channels, data rates supported by the RF bus transceivers, etc. The data for the mapping may be exchanged by the devices when in close proximity and updated periodically or as conditions, resources, etc., change.

Returning to the logic diagram of FIG. 15, the method continues at step 132 where available RF bus resources of the proximal devices are identified via data contained in the mapping. The method continues at step 134 where capabilities of the available RF bus resources of the proximal devices are determined. The capabilities include one or more of data rate, data quantity, duration availability of communication resource, an error rate, frequency band, transmit power, receiver sensitivity, and beamforming settings.

The method continues at step 136 where the capabilities of the available RF bus resources of the proximal devices are compared with capabilities of available intra-device RF bus resources. This is further described with references to steps 146-154, which will be described below. The method branches at step 138 depending on whether the capabilities of the available RF bus resources of the proximal devices compared favorably with the capabilities of available intra-device RF bus resources. If not, the method continues at step 144 where the intra-device RF bus resources are used.

If, however, the comparison was favorable, the method continues at step 140 where the use of the inter-device RF bus resources is indicated. The method then continues at step 142 where the desired inter-device RF bus resources of another device are determined by selecting at least one of the available RF bus resources based on the capabilities.

At step 146, the requirements of the inter-chip intra-device RF communication are determined. The requirements include one or more of data rate, data quantity, desired communication duration, an error rate, frequency band, transmit power, receiver sensitivity, and beamforming settings. The method continues at step 148 where the capabilities of a plurality of RF bus resources of the proximal devices are compared with the requirements of the inter-chip intra-device RF communication.

The method branches at step 150 depending on whether the comparison was favorable. If not, the method continues at step 154 where the intra-device RF bus resources are used. If the comparison was favorable, the method continues at step 152 where one or more RF bus resources of the plurality of RF bus resources of the proximal devices are identified as the available RF bus resources of the proximal devices. In other words, if the resource is not being used, is available for inter-device communications, and its capabilities meets or exceeds the requirements of the inter-device RF communication, then it is identified as an available RF bus resource.

FIG. 17 is a logic diagram of another embodiment of a method for inter-device and intra-device wireless communications that begins at step 160 where the desired inter-device RF bus resources of the other device and desired intra-device RF bus resources of the device are determined. The method continues at step 162 where the desired intra-device RF bus resources are reserved. The method continues at step 164 where a request for access to the desired inter-device RF bus resources is generated and subsequently transmitted.

When access to the desired inter-device RF bus resources is granted, the method continues at step 166 where an RF, or wireless, communication link is established to support the inter-chip intra-device RF communication using the desired inter-device RF bus resources and the desired intra-device RF bus resources. In an example, the inter-device RF bus resources may be used to support data and/or instructions conveyed in one direction and the intra-device RF bus resources used to support data and/or instructions conveyed in the other direction. As an example, the inter-device and intra-device RF bus resources function as a parallel link to support data and/or instruction conveyances.

FIG. 18 is a logic diagram of another embodiment of a method for inter-device wireless communications that begins at step 170 where the desired inter-device RF bus resources of the other device and second desired inter-device RF bus resources of a second other device are determined. The method continues at step 172 where the request for access to the desired inter-device RF bus resources and the second desired inter-device RF bus resources is granted and subsequently transmitted to the other devices.

When access to the desired inter-device RF bus resources and to the second desired inter-device RF bus resources is granted, the method continues at step 174 where the RF, or wireless, communication link is established to support the inter-chip intra-device RF communication using the desired inter-device RF bus resources and to the second desired inter-device RF bus resources.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) bus controller for use in a device, the RF bus controller comprises:
    an interface module; and
    a processing module, wherein
        the interface module receives an RF bus access request for an inter-chip intra-device RF communication;
        the interface module forwards a representation of the RF bus access request to the processing module;
        the processing module determines whether to grant the RF bus access request using intra-device RF bus resources or inter-device RF bus resources;
        when the inter-device RF bus resources are to be used, the processing module determines desired inter-device RF bus resources of another device;
        the processing module generates a request for access to the desired inter-device RF bus resources;
        the interface module transmits a representation of the request for access to the desired inter-device RF bus resources to an RF bus controller of the other device; and
        when access to the desired inter-device RF bus resources is granted, the processing module establishes an RF communication link to support the inter-chip intra-device RF communication.

2. The RF bus controller of claim 1, wherein the interface module comprises at least one of:
    a millimeter wave (MMW) transceiver;
    a serial port interface; and
    a parallel port interface.

3. The RF bus controller of claim 1 further comprises:
    the processing module determining whether to grant the RF bus access request using intra-device RF bus resources or inter-device RF bus resources by:
        accessing a mapping of RF bus resources of proximal devices;
        identifying available RF bus resources of the proximal devices;
        determining capabilities of the available RF bus resources of the proximal devices;
        comparing the capabilities of the available RF bus resources of the proximal devices with capabilities of available intra-device RF bus resources;
        when the capabilities of at least one of the available RF bus resources of the proximal devices compares favorably with the capabilities of the available intra-device RF bus resources, indicate the use of the inter-device RF bus resources; and
    the processing module determines desired inter-device RF bus resources of another device by selecting one of the at least one of the available RF bus resources based on the capabilities.

4. The RF bus controller of claim 3, wherein the processing module determines the capabilities of the available RF bus resources of the proximal devices by:
    determining requirements of the inter-chip intra-device RF communication, wherein the requirements include at least one of data rate, data quantity, desired communication duration, an error rate, frequency band, transmit power, receiver sensitivity, and beamforming settings;
    comparing the capabilities of a plurality of RF bus resources of the proximal devices with the requirements of the inter-chip intra-device RF communication; and
    when the comparison is favorable, identifying one or more RF bus resources of the plurality of RF bus resources of the proximal devices as the available RF bus resources of the proximal devices.

5. The RF bus controller of claim 1 further comprises:
    when the inter-device RF bus resources and intra-device RF bus resources are to be used, the processing module determines the desired inter-device RF bus resources of the other device and desired intra-device RF bus resources of the device;
    the processing module generates the request for access to the desired inter-device RF bus resources;
    the processing module reserves the desired intra-device RF bus resources;

the interface module transmits a representation of the request for access to the desired inter-device RF bus resources to the RF bus controller of the other device; and when access to the desired inter-device RF bus resources is granted, the processing module establishes an RF communication link to support the inter-chip intra-device RF communication using the desired inter-device RF bus resources and the desired intra-device RF bus resources.

6. The RF bus controller of claim 1 further comprises:
when the inter-device RF bus resources are to be used, the processing module determines desired inter-device RF bus resources of the other device and second desired inter-device RF bus resources of a second other device;
the processing module generates the request for access to the desired inter-device RF bus resources and the second desired inter-device RF bus resources;
the interface module transmits the representation of the request for access to the desired inter-device RF bus resources to the RF bus controller of the other device;
the interface module transmits a second representation of the request for access to the second desired inter-device RF bus resources to an RF bus controller of the second other device; and
when access to the desired inter-device RF bus resources and to the second desired inter-device RF bus resources is granted, the processing module establishes the RF communication link to support the inter-chip intra-device RF communication using the desired inter-device RF bus resources and to the second desired inter-device RF bus resources.

7. The RF bus controller of claim 1 further comprises the interface module receiving the RF bus access request from at least one of:
a circuit module of a first integrated circuit (IC), wherein the first IC supports the RF bus controller;
a circuit module of a second IC; and
an RF bus controller of a second device.

8. The RF bus controller of claim 1 further comprises, when the inter-device RF bus resources are to be used, the processing module determines the desired inter-device RF bus resources of the other device by:
transmitting, via the interface module, a request for available RF bus resources of the other device to an RF bus controller of the other device, wherein the request includes requirements of inter-chip intra-device RF communication;
receiving, via the interface module, a listing of the available RF bus resources of the other device having capabilities that compare favorably to the requirements of the inter-chip intra-device RF communication; and
selecting at least one of the available RF bus resources as the desired inter-device RF bus resources.

9. An integrated circuit (IC) for use in a device, the IC comprises:
a radio frequency (RF) bus controller; and
a plurality of circuit modules operably coupled to the RF bus controller, wherein the RF bus controller is operably coupled to:
receive an RF bus access request from one of the plurality of circuit modules for an intra-device RF communication;
determine whether to grant the RF bus access request using intra-device RF bus resources or inter-device RF bus resources;
when the inter-device RF bus resources are to be used, determine desired inter-device RF bus resources of another device;
transmit a request for access to the desired inter-device RF bus resources to an RF bus controller of the another device;
when access to the desired inter-device RF bus resources is granted, establish an RF communication link between the one of the plurality of circuit modules and a target circuit module of another IC within the device.

10. The IC of claim 9, wherein the RF bus controller is further operable to grant the RF bus access request using intra-device RF bus resources or inter-device RF bus resources by:
accessing a mapping of RF bus resources of proximal devices;
identifying available RF bus resources of the proximal devices;
determining capabilities of the available RF bus resources of the proximal devices;
comparing the capabilities of the available RF bus resources of the proximal devices with capabilities of available intra-device RF bus resources; and
when the capabilities of at least one of the available RF bus resources of the proximal devices compares favorably with the capabilities of the available intra-device RF bus resources, indicate the use of the inter-device RF bus resources.

11. The IC of claim 10, wherein the RF bus controller is further operable to determine the desired inter-device RF bus resources of another device by:
selecting one of the at least one of the available RF bus resources based on the capabilities.

12. The IC of claim 10, wherein the RF bus controller is further operable to determine the capabilities of the available RF bus resources of the proximal devices by:
determining requirements of the inter-chip intra-device RF communication, wherein the requirements include at least one of data rate, data quantity, desired communication duration, an error rate, frequency band, transmit power, receiver sensitivity, and beamforming settings;
comparing the capabilities of a plurality of RF bus resources of the proximal devices with the requirements of the inter-chip intra-device RF communication; and
when the comparison is favorable, identifying one or more RF bus resources of the plurality of RF bus resources of the proximal devices as the available RF bus resources of the proximal devices.

13. The IC of claim 9, wherein the RF bus controller is further operable to:
when the inter-device RF bus resources and intra-device RF bus resources are to be used, determine the desired inter-device RF bus resources of the other device and desired intra-device RF bus resources of the device;
generate the request for access to the second desired inter-device RF bus resources;
reserve the desired intra-device RF bus resources;
transmit a representation of the request for access to the second desired inter-device RF bus resources to the RF bus controller of the other device; and
when access to the desired inter-device RF bus resources is granted, establish an RF communication link to support the inter-chip intra-device RF communication using the desired inter-device RF bus resources and the desired intra-device RF bus resources.

14. The IC of claim 9, wherein the RF bus controller is further operable to:
  when the inter-device RF bus resources are to be used, determine desired inter-device RF bus resources of the other device and second desired inter-device RF bus resources of a second other device;
  generate the request for access to the desired inter-device RF bus resources and the second desired inter-device RF bus resources;
  transmits the representation of the request for access to the desired inter-device RF bus resources to the RF bus controller of the other device;
  transmits a second representation of the request for access to the second desired inter-device RF bus resources to an RF bus controller of the second other device; and
  when access to the desired inter-device RF bus resources and to the second desired inter-device RF bus resources is granted, establish the RF communication link to support the inter-chip intra-device RF communication using the desired inter-device RF bus resources and to the second desired inter-device RF bus resources.

15. The IC of claim 9, wherein, when the inter-device RF bus resources are to be used, the RF bus controller is further operably coupled to determine the desired inter-device RF bus resources of the other device by:
  transmitting a request for available RF bus resources of the other device to an RF bus controller of the other device, wherein the request includes requirements of inter-chip intra-device RF communication;
  receiving a listing of the available RF bus resources of the other device having capabilities that compare favorably to the requirements of the inter-chip intra-device RF communication; and
  selecting at least one of the available RF bus resources as the desired inter-device RF bus resources.

16. An integrated circuit (IC) for use in a device, the IC comprises:
  a first circuit module; and
  a second circuit module, wherein the first circuit module or the second circuit module communicates with a circuit module of another IC via a wireless communication link, wherein the IC and the other IC are within a device, and wherein the first circuit module or the second circuit module is operable to create the wireless communication link by:
    determining whether to establish the wireless communication link using intra-device RF bus resources or inter-device RF bus resources;
    when the inter-device RF bus resources are to be used, determining desired inter-device RF bus resources of another device;
    transmitting a request for access to the desired inter-device RF bus resources to a circuit module of the other device;
    when access to the desired inter-device RF bus resources is granted, establishing the wireless communication link using the desired inter-device RF bus resources.

17. The IC of claim 16, wherein the first circuit module or the second circuit module is further operable to determine whether to establish the wireless communication link using intra-device RF bus resources or inter-device RF bus resources by:
  accessing a mapping of RF bus resources of proximal devices;
  identifying available RF bus resources of the proximal devices;
  determining capabilities of the available RF bus resources of the proximal devices;
  comparing the capabilities of the available RF bus resources of the proximal devices with capabilities of available intra-device RF bus resources; and
  when the capabilities of at least one of the available RF bus resources of the proximal devices compares favorably with the capabilities of the available intra-device RF bus resources, indicate the use of the inter-device RF bus resources.

18. The IC of claim 17, wherein the first circuit module or the second circuit module is further operable to determine the desired inter-device RF bus resources of another device by:
  selecting one of the at least one of the available RF bus resources based on the capabilities.

19. The IC of claim 17, wherein the first circuit module or the second circuit module is further operable to determine the capabilities of the available RF bus resources of the proximal devices by:
  determining requirements of the inter-chip intra-device RF communication, wherein the requirements include at least one of data rate, data quantity, desired communication duration, an error rate, frequency band, transmit power, receiver sensitivity, and beamforming settings;
  comparing the capabilities of a plurality of RF bus resources of the proximal devices with the requirements of the inter-chip intra-device RF communication; and
  when the comparison is favorable, identifying one or more RF bus resources of the plurality of RF bus resources of the proximal devices as the available RF bus resources of the proximal devices.

20. The IC of claim 16, wherein the first circuit module or the second circuit module is further operable to:
  when the inter-device RF bus resources and intra-device RF bus resources are to be used, determine the desired inter-device RF bus resources of the other device and desired intra-device RF bus resources of the device;
  generate the request for access to the desired inter-device RF bus resources;
  reserve the desired intra-device RF bus resources;
  transmit a representation of the request for access to the desired inter-device RF bus resources to the circuit module of the other device; and
  when access to the desired inter-device RF bus resources is granted, establish the wireless communication link using the desired inter-device RF bus resources and the desired intra-device RF bus resources.

21. The IC of claim 16, wherein the first circuit module or the second circuit module is further operable to:
  when the inter-device RF bus resources are to be used, determine desired inter-device RF bus resources of the other device and second desired inter-device RF bus resources of a second other device;
  generate the request for access to the desired inter-device RF bus resources and the second desired inter-device RF bus resources;
  transmits the representation of the request for access to the desired inter-device RF bus resources to the circuit module of the other device;
  transmits a second representation of the request for access to the second desired inter-device RF bus resources to a circuit module of the second other device; and
  when access to the desired inter-device RF bus resources and to the second desired inter-device RF bus resources is granted, establish the wireless communication link using the desired inter-device RF bus resources and the second desired inter-device RF bus resources.

22. The IC of claim 16, wherein, when the inter-device RF bus resources are to be used, the first circuit module or the second circuit module is further operably coupled to determine the desired inter-device RF bus resources of the other device by:

transmitting a request for available RF bus resources of the other device to the circuit module of the other device, wherein the request includes requirements of inter-chip intra-device RF communication;

receiving a listing of the available RF bus resources of the other device having capabilities that compare favorably to the requirements of the inter-chip intra-device RF communication; and selecting at least one of the available RF bus resources as the desired inter-device RF bus resources.

\* \* \* \* \*